C. C. SUNDERLAND.
COUPLING.
APPLICATION FILED NOV. 10, 1916.
1,249,241.
Patented Dec. 4, 1917.
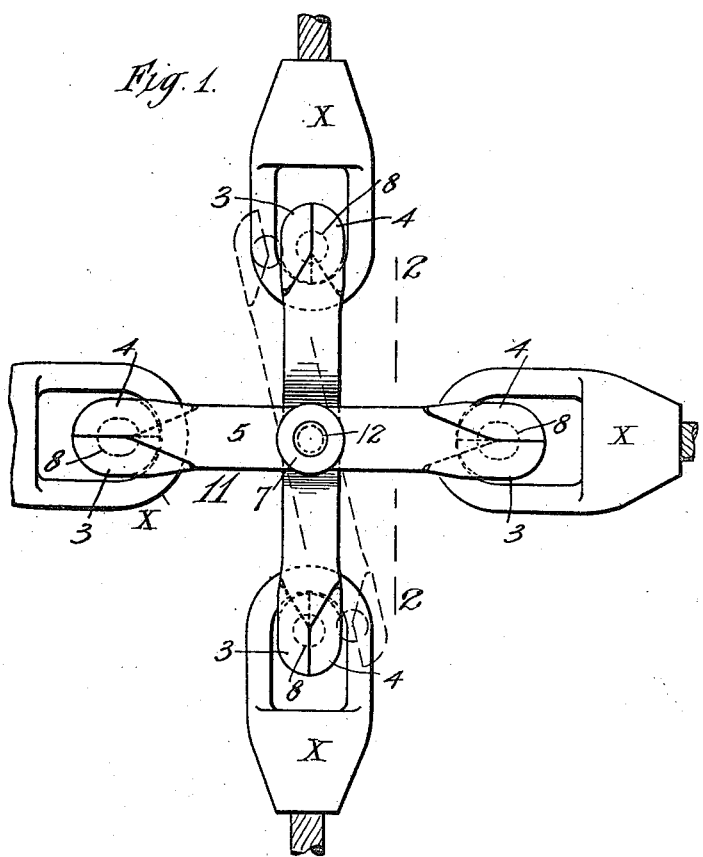
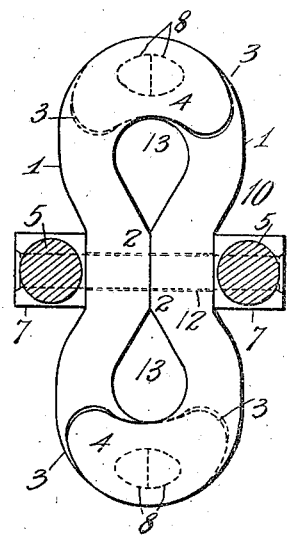
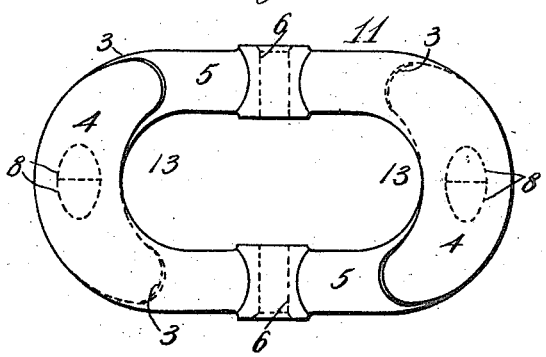
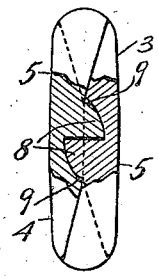
Inventor:
Charles C. Sunderland
by his Attys:
Philipp Sawyer Rice & Kennedy

UNITED STATES PATENT OFFICE.

CHARLES C. SUNDERLAND, OF TRENTON, NEW JERSEY, ASSIGNOR TO JOHN A. ROEBLING'S SONS COMPANY, A CORPORATION OF NEW JERSEY.

COUPLING.

1,249,241. Specification of Letters Patent. Patented Dec. 4, 1917.

Application filed November 10, 1916. Serial No. 130,568.

*To all whom it may concern:*

Be it known that I, CHARLES C. SUNDERLAND, a citizen of the United States, residing at Trenton, county of Mercer, and State of New Jersey, have invented certain new and useful Improvements in Couplings, fully described and represented in the following specification and the accompanying drawings, forming a part of the same.

This invention relates to improvements in connections for ropes and the like, and has for its object the provision of a satisfactory connection device or coupling by which four or more ropes or the like may be connected with provision for free swinging movement and which preferably is adapted for ready connection to or disconnection from rope eyes, thimbles, and like closed terminals.

In the accompanying drawing, forming a part of this specification, there is shown a four way connection embodying all the features of the invention in their preferred form, and this construction will now be described in detail, and the features forming the invention then specifically pointed out in the claims.

In the drawing—

Figure 1 is a side view of the connection with four rope eyes connected thereto and showing one of the connection members opened in dotted lines.

Fig. 2 is a section on line 2—2 of Fig. 1, showing the inner member.

Fig. 3 is a plan view of the outer member; and

Fig. 4 is an end view of one of the members partly in section.

Referring to the drawings, the connection piece or coupling consists of two double-eye members 10 and 11, the one passing through the other and the members being pivoted together transversely from edge to edge by pivot pin 12, extending through the side bars of the members. Each double-eye member provides two of the four eyes 13 which are shown in Fig. 1 as entered by the rope terminal eyes X.

The inner double-eye member 10 is formed in two parts 1 pivoted together by pin 12 and preferably bent inward centrally so as to form inner tongue portions 2 which abut, this construction reducing the central dimension of the member 10 for inclosure by the outer member, thus reducing the size of the outer member and holding it in place, even though the pivot pin should break. Each part 1 has two outer tongues 3, 4 adapted to overlap the tongues 3, 4 of the other part, so as to form a closed eye at each end of the member 10 when swung against each other on pivot pin 12.

The outer member 11 is similar to member 10 but is formed so as to inclose the member 10 by its side pieces 5 and provided with bosses 6 forming bearings for member 10 and having holes for the passage of the pivot pin 12. Each tongue 3, 4 preferably is provided with a lug 8 and a recess 9 so positioned that when the tongues are closed together, the lugs 8 fit within the recesses 9 and abut, thus greatly strengthening the construction against sidewise movement of the parts of the members on each other and avoiding sidewise strain on the pivot pin 12.

The rope eyes are easily connected to and disconnected from the coupling shown by moving the parts 1 of the members away from each other about the pivot pin 12, so as to separate the end tongues, as shown in dotted lines in Fig. 1, when the rope terminal eyes may be slipped between the tongues and into or out of the eyes 13, which then are closed by moving the parts 1 against each other.

While only a four-way connection is shown, it will be understood that one or more additional members may be pivoted in series outside of member 11, and as many connections as desired made.

It will be understood, also, that the invention, considered broadly, includes constructions in which the double eye members are not made to open and close for the receipt of closed eyes, but are made of single pieces and adapted for use with hooks or other open eyes.

What is claimed is—

1. A coupling having a plurality of inner and outer double eye members pivoted one within the other on the same transverse axis.

2. A coupling having a plurality of inner and outer double eye members, each double eye member consisting of two parts with end tongues overlapping each other and all the parts pivoted on the same transverse axis.

3. A coupling having two part member 10 having side bars 1 and overlapping end tongues 3, 4, and having its central portion reduced in size, similar member 11 inclosing the reduced portions of member 10, and pivot pin 12 extending through the central portion of the members.

In testimony whereof, I have hereunto set my hand.

CHARLES C. SUNDERLAND.

Copies of this patent may be obtained for five cents each, by addressing the "Commissioner of Patents, Washington, D. C."